United States Patent [19]

Carini et al.

[11] 3,906,124
[45] Sept. 16, 1975

[54] METHOD OF APPLYING VITREOUS ENAMEL GROUND COAT

[75] Inventors: George Francis Carini; Ernest Mayer Hommel, both of Pittsburgh; James Raymond Twigger, Houston, all of Pa.

[73] Assignee: The O. Hommel Company, Pittsburgh, Pa.

[22] Filed: Feb. 15, 1974

[21] Appl. No.: 442,911

Related U.S. Application Data

[62] Division of Ser. No. 290,221, Sept. 18, 1972, abandoned.

[52] U.S. Cl. ............... 427/309; 427/328; 427/330; 427/376; 427/405; 427/419; 427/438
[51] Int. Cl.² ......................................... C23D 5/00
[58] Field of Search ....... 117/70 A, 70 C, 71 M, 49, 117/129, 50; 427/328, 330, 376, 405, 419

[56] References Cited
UNITED STATES PATENTS

| | | | |
|---|---|---|---|
| 1,833,087 | 11/1931 | Migeot | 106/48 |
| 2,961,337 | 11/1960 | Bryant et al. | 117/50 |
| 2,977,241 | 3/1961 | Oliver et al. | 117/129 X |
| 2,981,634 | 4/1961 | Davis et al. | 117/129 X |
| 3,158,515 | 11/1964 | Michael | 106/48 X |
| 3,458,344 | 7/1969 | Little et al. | 117/129 X |

*Primary Examiner*—Ralph Husack
*Attorney, Agent, or Firm*—Webb, Burden, Robinson & Webb

[57] ABSTRACT

Vitreous enamel ground coat frit compositions substantially free of traditional adherence promoting oxides comprising barium oxide.

1 Claim, No Drawings

METHOD OF APPLYING VITREOUS ENAMEL GROUND COAT

This is a division of application Ser. No. 290,221, filed Sept. 18, 1972, now abandoned. This invention is directed toward vitreous enamel ground coat frit compositions for application to ferrous metal surfaces. More specifically, this invention is directed to ground coat frit compositions which when applied with the usual techniques adhere strongly to ferrous metals without incorporating the typical adherence oxides such as cobalt, nickel, manganese and copper.

It has been found that sufficient barium oxide in certain ground coat frits will provide the necessary adherence characteristic on ferrous metals having a nickel flash and will increase the range of firing temperatures over which satisfactory bonding is developed. Further, by eliminating expensive raw materials yielding the typical adherence promoting oxides, the costs of ground coat frits can be considerably reduced. Hence, enamelware which require a base or ground coat can be produced at a substantial reduction of cost while maintaining the quality of the finished ware.

It is an object of this invention to provide novel vitreous enamel ground coat frit compositions substantially free of adherence oxides for application to ferrous metals having a nickel flash. It is a further object of this invention to provide novel vitreous enamel ground coat frit compositions which bond to appropriate substrates over a wide range of firing temperatures. It is still further an object of this invention to provide vitreous enamel ground coat frit compositions at a substantial reduction in cost as compared to vitreous enamels which incorporate adherence promoting oxides such as cobalt, nickel, manganese and copper.

Briefly, according to this invention, there is provided a vitreous enamel ground coat frit composition substantially free of cobalt, nickel, manganese, iron, copper, antimony and arsenic oxides which after firing at elevated temperatures adheres strongly to ferrous metal on which has been deposited not less than 0.02 gram per square foot of nickel. The oxide analyses of frits according to this invention are set forth in the following table:

| Oxide | | Preferred Range | Operable Range | |
|---|---|---|---|---|
| Soda | $Na_2O$ | 12–18 | up to 18 | |
| Potash | $K_2O$ | up to 3 | up to 3 | Total |
| Lithia | $Li_2O$ | up to 3 | up to 10 | 10 |
| Alumina | $Al_2O_3$ | 3 to 6 | up to 6 | to 30 |
| Boron oxide | $B_2O_3$ | 15 to 20 | 15 to 25 | |
| Silica | $SiO_2$ | 35 to 55 | 30 to 60 | |
| Fluorine | $F_2$ | up to 4 | 1 to 10 | |
| Barium oxide | $BaO$ | 6 to 16 | 1 to 20 | |
| Lime | $CaO$ | 2 to 10 | up to 15 | |
| Magnesia | $MgO$ | up to 1 | up to 1 | |
| Zinc oxide | $ZnO$ | up to 4 | up to 4 | |
| Phosphorous oxide | $P_2O_5$ | up to 2 | up to 2 | |
| Zirconia | $ZrO_2$ | up to 3 | up to 5 | |

Further features and other objects and advantages of Our invention will become clear to those skilled in the art after careful study of the following detailed description.

To coat ferrous metals, such as enameling iron or cold rolled steel, it is important that the metal be carefully cleaned before the enamel is applied. The cleaning consists of immersion of the metal in a cleaner which may be one of a large number of well known cleaners now on the market. This treatment removes grease and dirt. The metal is then rinsed with hot water and then given a pickling treatment, for example, in a 7% to 9% solution of sulphuric acid heated to a temperature of about 150°–160°F. The pickled metal is then rinsed with water and placed in a solution of nickel sulphate for the purposes of depositing a thin film of nickel of not less than 0.02 or greater than 0.12 gram per square foot on the surface of the metal. This is referred to as nickel flashing. The nickel-flashed steel is rinsed again with water to complete the cleaning operation and then neutralized to remove acid and dried. For a more complete description of the general procedures of application of porcelain enamels to metal substrates, reference is made to *Enamels, the Preparation, Application and Properties of Vitreous Enamels* by Andrew I. Andrews. (The Garrard Press, Champaign, Illinois, 1935).

Frits are prepared by smelting operations in which dry ingredients containing the oxide constituents are mixed together and heated in a furnace at temperatures from about 1,800° to 2,400°F to melt the batch components.

Molten frit is discharged after smelting into a body of water or passed through water cooled rolls to solidify the frit. The frits are then treated to form slips or slurrys by grinding (ball milling) in a water or another suspension vehicle to a finely ground state. The grinding is preferably to a fineness of 5 to 8 grams retained in a 200 mesh screen from a 100 gram sample.

Soluble or insoluble solid or liquid milling components (mill additions) such as clay, silica, sodium nitrite, borax, magnesium carbonate and potassium carbonate are added to the slip as part of the milling charge of the ball mill to adjust the rheological properties of the slip. Soluble compounds added to the mill batch to control the properties of the slip are termed electrolytes. Also, coloring pigments may be added to the frit as they are being prepared as slips.

Preparation of the slip provides a suspension of the finely divided frits and mill additives in water or other liquid vehicles to a consistency such that the material may be applied to ferrous metal by spraying, dipping or flow coating in a conventional manner. The coating is applied to a thickness, for example, from 4 to 20 mills on a dry basis uniformly covering the entire surface.

Following normal enameling procedures, the coated articles are placed in a dryer at a temperature sufficient to remove excess water which is usually about 200° to 300°F and then placed in a furnace and fired at a temperature from about 1400° to 1550°F preferably about 1480°F for about 3 minutes for the purpose of maturing the coating to the extent that it forms a uniform coating which adheres strongly to the ferrous article. The firing time or temperature may be varied depending on the dimensions of the article and other factors. A coated ferrous article is then removed from the furnace and cooled.

The oxide analyses of five exemplary enamel frits made according to this invention are set forth in the following table: (Throughout this specification and the attached claims, weight percentages and parts by weight are meant wherever percentages and parts are considered.)

| Oxide | | Example I | Example II | Example III | Example IV | Example V |
| --- | --- | --- | --- | --- | --- | --- |
| Soda | Na₂O | 16.09 | 15.19 | 16.12 | 14.88 | 14.54 |
| Potash | K₂O | 2.73 | 0.70 | 1.90 | 1.91 | 2.64 |
| Lithia | Li₂O | — | 0.75 | — | 0.12 | — |
| Alumina | Al₂O₃ | 5.51 | 4.78 | 3.82 | 4.12 | 5.29 |
| Boron oxide | B₂O₃ | 18.43 | 17.10 | 17.41 | 17.13 | 18.43 |
| Silica | SiO₂ | 40.02 | 34.60 | 37.74 | 32.57 | 53.04 |
| Fluorine | F₂ | 1.12 | 2.19 | 1.79 | 3.03 | 1.68 |
| Zirconia | ZrO₂ | — | 0.50 | — | — | — |
| Phosphorous oxide | P₂O₅ | 0.12 | 1.26 | 0.37 | 0.94 | 0.12 |
| Magnesium | MgO | 0.16 | — | 0.11 | 0.18 | 0.11 |
| Barium oxide | BaO | 8.84 | 13.07 | 10.38 | 14.00 | 1.00 |
| Lime | CaO | 6.80 | 6.44 | 9.33 | 6.76 | 3.31 |
| Zinc oxide | ZnO | — | — | 1.37 | 3.43 | — |

The frits set forth in the table above were prepared as a slip having the following mill additions:

| | |
| --- | --- |
| frit | 100 parts |
| clay | 7 parts |
| borax | ½ part |
| sodium nitrite | ¼ part |
| magnesium carbonate | ⅛ part |

When applied and fired on metal substrates as described above, these frits provided enamel coatings with satisfactory adherence. It has also been found that coatings prepared from frits according to this invention have a wide range of maturation times and temperatures at which the coating is fused to the substance. This is very important where large metal shapes are being enameled as it is not possible to provide the same firing treatment to every portion of the shape.

Having thus described the invention with the detail and particularity as required by the Patent Laws, what is desired protected by Letters Patent is set forth in the following claims.

We claim:

1. A method of applying vitreous enamel ground coat to a ferrous metal substrate comprising the steps for:
   1. pickling and nickel flashing the metal substate;
   2. preparing a batch consisting essentially of 100 parts of a frit analyzing up to 18% by weight Na₂O, up to 3% K₂O, up to 10% Li₂O, up to 6% Al₂O₃, 15 to 25% B₂O₃, 30 to 60% SiO₂, 1 to 10% F₂, 1 to 20% BaO, up to 15% CaO, up to 1% MgO, up to 4% ZnO, up to 2% P₂O₅, up to 5% ZrO₂ and incidental impurity oxides and said batch further consisting of mill additions of slip forming ingredients;
   3. milling the ingredients with a vehicle to form a suitable slip;
   4. applying the slip to the substrate treated in step 1 to form a coating;
   5. drying and firing the coating at a temperature between 1,100° and 1,600°F; and
   6. recovering a substrate with a satisfactory enamel ground coat.

* * * * *